United States Patent
Autterson

(10) Patent No.: US 6,331,335 B1
(45) Date of Patent: *Dec. 18, 2001

(54) SELF-ADHESIVE WIRE STRAP AND METHODS OF CONSTRUCTING AND UTILIZING SAME

(75) Inventor: Christopher S. Autterson, Novi, MI (US)

(73) Assignee: Argent Automotive Systems, Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/856,047

(22) Filed: May 14, 1997

Related U.S. Application Data

(63) Continuation of application No. 08/500,099, filed on Jul. 10, 1995, now abandoned.

(51) Int. Cl.$^7$ ........................................................ B32B 3/02
(52) U.S. Cl. .................. 428/40.1; 24/69 WT; 24/71 CT; 428/40.9; 428/41.7; 428/41.8; 428/194; 428/354
(58) Field of Search ................... 428/40.1, 41.1, 428/41.7, 41.8, 40.9, 354, 192, 194, 195; 24/69 WT, 71 CT, DIG. 11

(56) References Cited

U.S. PATENT DOCUMENTS

| | | | |
|---|---|---|---|
| 4,554,193 | 11/1985 | Erickson | 428/40.1 |
| 4,695,493 | * 9/1987 | Friedlander | 428/41.1 |
| 4,704,315 | * 11/1987 | McClintock | 428/41.1 |
| 4,770,913 | 9/1988 | Yamamoto | 428/40.1 |
| 4,839,206 | 6/1989 | Waldenberger | 428/40.1 |
| 4,950,517 | * 8/1990 | Loggins | 428/41.9 |
| 5,049,445 | 9/1991 | Arvidsson et al. | 428/352 |
| 5,130,185 | 7/1992 | Ness | 428/401 |
| 5,212,002 | 5/1993 | Madrzak et al. | 428/40.1 |
| 5,827,589 | * 10/1998 | Autterson | 428/40.1 |

* cited by examiner

*Primary Examiner*—Nasser Ahmad
(74) *Attorney, Agent, or Firm*—Irving M. Weiner; Pamela S. Burt; Weiner & Burt, P.C.

(57) ABSTRACT

A self-adhesive strap to hold wires or other components permanently using a self-adhesive backed, flexible high strength carrier member as the main component of wire strap or harness. The strap has adhesive on the opposite side of the carrier member to facilitate bonding to a substrate, such as a wall. The strap replaces mechanically retained wire clips as straps. To apply the self-adhesive wire strap, first the back liner is removed and the adhesive is attached to the substrate; then the larger piece of liner is removed using the extended tab and the wire is placed against adhesive; and finally the strap is folded against itself and pushed together, adhesive to adhesive.

12 Claims, 2 Drawing Sheets

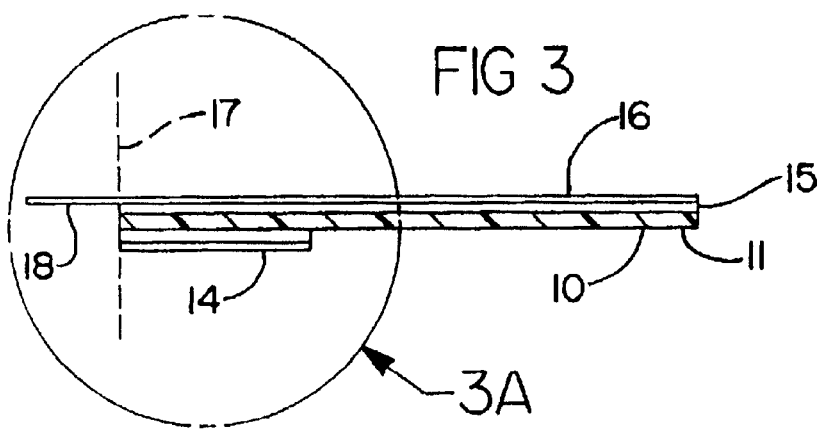
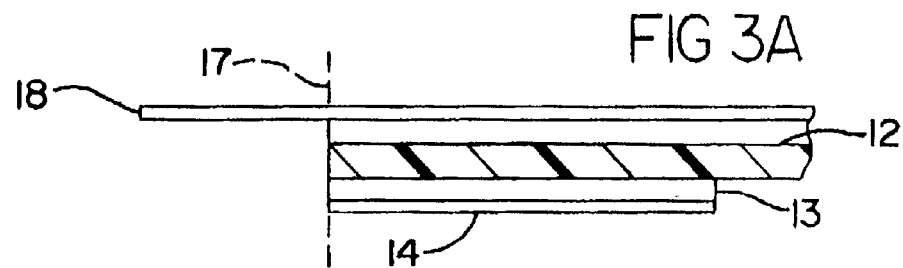

SELF-ADHESIVE WIRE STRAP AND METHODS OF CONSTRUCTING AND UTILIZING SAME

This is a file wrapper continuation of prior application Ser. No. 08/500,099 filed Jul. 10, 1995 now abandoned.

BACKGROUND OF THE INVENTION

1. Field of the Invention

The present invention relates generally to an improvement in self-adhesive devices, and methods of constructing and utilizing same. In particular, the present invention relates to a self-adhesive strap for permanently holding wires or other components using a self-adhesive backed high strength material as the strap or harness.

2. Description of the Relevant Art

The relevant art is exemplified by the following United States patents.

Erickson (Ende Company) U.S. Pat. No. 4,554,193, entitled "SUBSTRATE WITH DIFFERENTIAL ADHESION", discloses bonding means for achieving differential adhesion of articles such as picture frames, posters or other decorative items to wall surfaces and the like. The bonding device has adhesives secured to each of two major surfaces, with the adhesive having differential adhesion characteristics. A first adhesive is selected to achieve permanent bonding of the bonding means to the article to be displayed, with the second adhesive layer being an adhesive with low peel-low shear properties to permit removal from the wall surface whenever desired. The second adhesive provides semi-permanent positioning of the article being displayed, but permits removal thereof upon demand. The bonding means comprises a substrate with a first substantially permanent adhesive layer secured to one surface thereof, and with a co-extruded polyolefin-polyester film being bonded to the second surface thereof, and including a second adhesive layer applied to the polyester surface of the co-extruded film portion.

Yamamoto U.S. Pat. No. 4,770,913, entitled "BINDER", discloses improved binders or binding seals which have a substrate of a flexible material. At one end of the substrate is provided an ordinary adhesive layer, and at the other end is provided a peelable adhesive layer covered with an ordinary adhesive layer. The peelable adhesive layer allows the user to stick the end of the binder and peel it whenever desired. The binder may be formed with a hole or holes at one end to secure it to a file, and with a peelable adhesive layer at the other end so that a document can be stuck and peeled on and from it.

Waldenberger (Norton Company) U.S. Pat. No. 4,839,206, entitled "DOUBLE SIDED ADHESIVE TAPE", discloses a double sided adhesive tape with a low surface energy adhesive on at least one side. The low surface energy adhesive has superior properties when the adherend is of the low surface energy type such as low surface energy acrylic paint, polyethylene, polytetrafluoroethylene and the like and the surface energy of the adhesive is lower than that of the adherend.

Arvidsson et al. (Intermall AB) U.S. Pat. No. 5,049,445, entitled "MASKING TAPE AND METHOD FOR MANUFACTURING ROLLS OF SUCH TAPE", discloses a masking tape, for example for spray-painting, comprising a strip of tearable material such as paper having an upper face and a lower face. A first pressure-sensitive adhesive layer covers the lower face of the strip from one side edge thereof to the opposite side edge. A second pressure-sensitive layer is applied to the upper face of the strip, and the second layer has a longitudinal extent co-extensive with that of the strip and a transverse extent less than half that of the strip and being positioned close to one edge of the strip. A release liner covers the second adhesive layer. The masking tape is to be fixed to a surface to be painted in such a position that the free-edge of the strip forms a border to the area to be painted. The release liner is removed and a masking paper is fixed to the adhesive layer and cut clean along the inner edge thereof. The masking tape is manufactured by laminating two tapes, one wider tape comprising a tearable strip with an adhesive layer on its lower face, and a narrower tape comprising a release liner and a releasable adhesive layer covering the lower face of the release liner, and being securely attached to the upper face of the wider tape.

Ness U.S. Pat. No. 5,130,185, entitled "DOUBLE SIDED PRESSURE SENSITIVE ADHESIVE", discloses a double-sided, pressure-sensitive, adhesive tape having a release paper on an adhesive surface. The release paper has a plurality of spaced-apart areas which have a lesser degree of adhesive to the adhesive surface than the remaining area of the release paper.

Madrzak et al. (J. M. Voith GmbH) U.S. Pat. No. 5,212,002, entitled "SPLICE AND PROCESS FOR MAKING A SPLICE ON THE LEADER OF A PAPER ROLL", discloses for making a web connetion, an adhesive tape which essentially features on only one side an adhesive layer. The cover foil of this adhesive layer is comprised of two parts that are separated by a longitudinal seam. Applied on the other side of the substrate of the adhesive layer is at least one narrow adhesive strip, also having a cover foil, which preferably is contained on an edge of the adhesive tape.

None of the previous devices and techniques have provided a self-adhesive strap for permanently hold wires or other components using a self-adhesive backed high strength strap or harness. Indeed, a desideratum of the present invention is to avoid the animadversions of the previous devices and techniques. It would thus be desirable to provide a device which, in addition to eliminating the problems and disadvantages of previous techniques, provides very new and desirable features, heretofore unattainable.

SUMMARY OF THE INVENTION

The present invention provides a self-adhesive strap for securing an object to an external member. The strap comprises a carrier member having a first predetermined elongated major surface of one side thereof, and a second predetermined elongated major surface on a side opposite to said one side. A first predetermined quantity and configuration of adhesive is disposed on a predetermined portion of the first predetermined elongated major surface of the carrier member. A first release liner is releasibly disposed on the first predetermined quantity and configuration of adhesive. A second predetermined quantity and configuraton of adhesive is disposed on a predetermined portion of the second predetermined elongated major surface of the carrier member. A second release liner is releasibly disposed on a second predetermined quantity and configuration adhesive. The first release liner is removable to expose the first predetermined quantity and configuration of adhesive. The strap is pressed against the external member so that the first predetermined quantity and configuration of adhesive may secure the strap to the external member. The second release liner is removable to expose the second predetermined quantity and configuration of adhesive. The carrier member together with the second predetermined quantity and configuration of adhesive is wrapped around a predetermined portion of said object. A predetermined portion of the second predetermined quantity and configuration of adhesive is pressed against a different predetermined portion of the second predetermined quantity and configuration of adhesive to complete securement of the object within the strap and to said external member.

The present invention also provides a self-adhesive strap to permanently hold wires or other components using a self-adhesive backed high strength flexible film or foil, such as woven polypropylene, or a high strength polyester film, or aluminum foil, as the wire strap or harness.

The present invention provides a strap which can effectively replace mechanical retaining wire clips or straps.

It is an object of the invention to provide a self-adhesive wire strap to replace expensive wire clips and straps that are held to surfaces with screws or other forms of mechanical attachments.

Another object of the invention is to provide a self-adhesive wire strap permanently holding external objects to a substrate using a high strength film, foil or carrier as the harness.

Other objects, advantages and applications of the present invention will become apparent to those skilled in the art when the accompanying description of the best mode contemplated for practicing the invention is read in conjunction with the accompanying drawings.

BRIEF DESCRIPTION OF THE DRAWINGS

The description herein makes reference to the accompanying drawings wherein like references refer to like or equivalent parts, and in which:

FIG. 3 depicts a sectional view of the FIG. 2 device taken along the line 3—3.

FIG. 3a illustrates in an enlarged fashion a portion of the inventive device as circled in phantom line in FIG. 3.

DESCRIPTION OF SOME PREFERRED EMBODIMENTS

Figure 1:
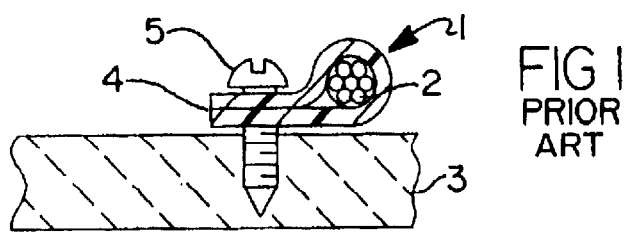
FIG. 1 illustrates a prior art technique for securing a wire or cable to a substrate.

Referring to FIG. 1, there is illustrated a prior art device 1 for securing a wire or cable 2 to an external object or substrate 3, such as a wall, beam, automotive interior, boat interior, trailor interior, etc. The prior art technique involves an expensive wire clip or strap 4, which may be formed of plastic or metal. The clip 4 holds or encircles the wire or cable 2 to be secured to the external substrate 3. A conventional fastener, such as a screw 5 passes through two ends of the clip 4 to secure the device 1 to an external substrate or wall 3.

FIGS. 2–5 illustrate a preferred embodiment of the present invention.

Figure 2:
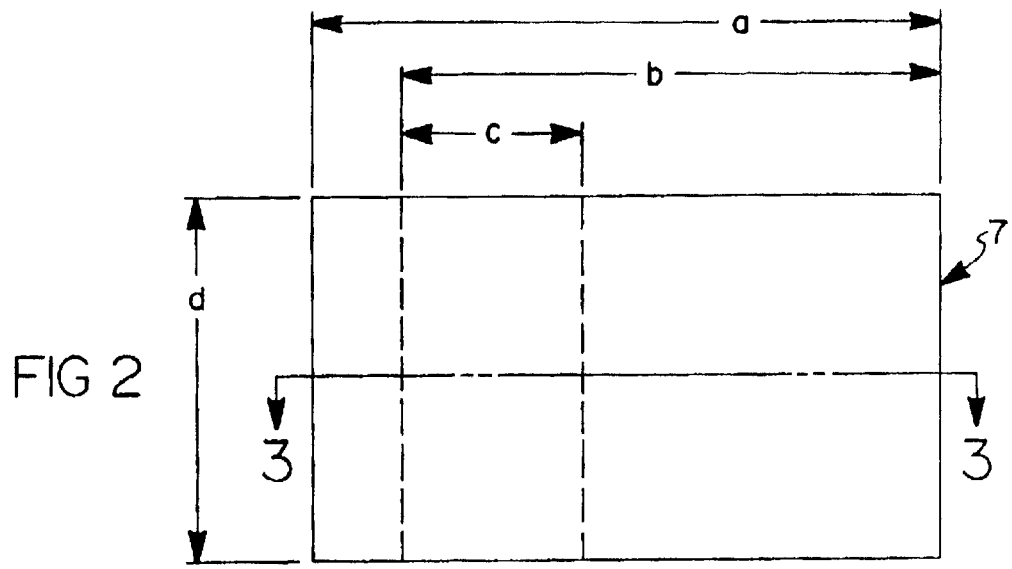
FIG. 2 illustrates a top plan view of a self-adhesive device according to one embodiment of the present invention.

FIG. 2 illustrates a top plan view of a self-adhesive device 7 according to the present invention as shown before it has been placed in use to secure an object 8 to an external member 9. The dimensions a, b, c, and d as shown in FIG. 2 may be any appropriate or suitable dimensions to accommodate the particular application of use of the inventive device 7. In a preferred embodiment of the invention, the dimension a may preferably, but not necessarily, be approximately 89 millimeters; the dimension b may preferably, but not necessarily be approximately 76 millimeters; the dimensions c may preferably, but not necessarily, be approximately 25 millimeters; and the dimension d may preferably, but not necessarily, be approximately 25 millimeters.

FIG. 3 illustrates a cross-sectional elevational view of the self-adhesive device 7 taken along the line 3—3 in FIG. 2. FIG. 3(A) shows an exploded portion of the FIG. 3 configuration. The self-adhesive device or strap 7 includes a carrier member 10 having a first predetermined elongated major surface 11 on one side thereof, and a second predetermined elongated major surface 12 on a side opposite to said one side. A first predetermined quantity and configuration of adhesive 13 is disposed on a predetermined portion of the first predetermined elongated major surface 11 of the carrier member 10.

A first release liner 14 is releasibly disposed on the first predetermined quantity and configuration of adhesive 13. A second predetermined quantity and configuration of adhesive 15 is disposed on a predetermined portion of the second predetermined elongated major surface 12 of the carrier member 10.

A second release liner 16 is releasibly disposed on the second predetermined quantity and configuration of adhesive 15.

Preferably, but not necessarily, the carrier member 10, the first predetermined quantity and configuration of adhesive 13, the first release liner 14, and the second predetermined quantity and configuration of adhesive 15 terminate in a common plane 17 as indicated in FIGS. 3 and 3A.

The first release liner 14 is removeable to expose the first predetermined quantity and configuration of adhesive 13. After the first release liner 14 is removed, the strap 7 is pressed against the external member 9 so that the first predetermined quantity and configuration of adhesive 13 may secure the strap 7 to the external member 9. The second release liner 16 is then removed to expose the second predetermined quantity and configuration of adhesive 15. The self-adhesive strap 7 is shown in FIG. 4 secured to the external member 9 with the second release liner 16 removed.

To facilitate removal of the second release liner 16, the second release liner 16 is provided with an exposed tab 18 as illustrated at the extreme left-hand portion of FIG. 3 and FIG. 3a. This enables the user to easily grasp the second release liner 16 for removing it from the second predetermined quantity and configuration of adhesive 15.

Figure 4:
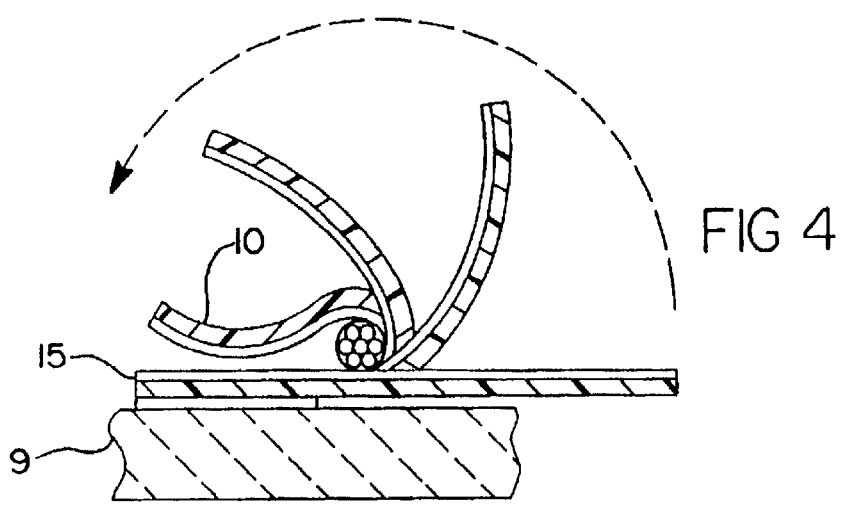
FIG. 4 illustrates the inventive device as it is being folded over the wire cable.
Figure 5:
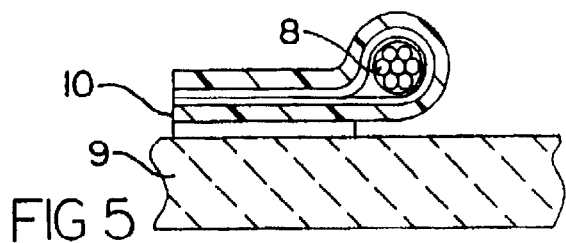
FIG. 5 illustrates the inventive device in its final form permanently affixing the wire cable to an external substrate.

As illustrated in FIG. 4, the carrier member 10 together with the second predetermined quantity and configuration of adhesive 15 is folded over the object, such as a wire 8, which is to be secured to the external member 9. As shown in FIGS. 4 and 5, the strap 7 is folded over against itself and pushed together, adhesive to adhesive, to form an extremely secure bond.

FIG. 5 illustrates the self-adhesive strap 7 in its final position securing the wire 8 to an external member, such as a wall or other substrate 9.

It should be noted that the carrier member 10 preferably, but not necessarily, is fabricated from a polypropylene, a polyester, or a metallic foil, such as, for example, aluminum foil.

It should be apparent to a person skilled in the art that the present invention readily serves the same purpose as conventional wire harnesses in the form of injection molded clips. However, the self-adhesive strap 7 of the present invention readily accommodates various types and sizes of wire 8, without having to resort to a supply of different sized injection molded wire harnesses 4. Furthermore, because the present invention does not require conventional fastening elements 5, such as screws or rivets, it can be more easily applied to inconveniently located substrates 9.

It is also significant to note that at least a portion of the second predetermined quantity and configuration of adhesive 15 adheres to the wire 8 as part of the permanent connection preventing the wire 8 from slipping or moving.

It is also important to note that the present invention preferably, but not necessarily, includes a flexible, substantially high strength carrier member 10 having opposed major surfaces with preferably different portions of adhesive thereon.

While the foregoing has described the features and advantages of several embodiments of the present invention, it will be apparent to those skilled in the art that changes in form, dimensions, materials and proportions and minor detail of construction may be resorted to without departing from the spirit of the present invention or the scope of the appended claims.

I claim:

1. A self-adhesive strap device at least partially limiting movement of a wire relative to a substantially planar external member, comprising, in combination:

a strap member having a first predetermined major surface on one side thereof, and a second predetermined major surface on a side opposite said one side;

said strap member comprising a high strength flexible film fabricated from a material selected from the group consisting of a metallic foil, a polypropylene, and a polyester;

first securement means disposed on only a predetermined portion of said first predetermined major surface of said strap member permanently securing said strap member to said substantially planar external member, said predetermined portion consists of a minor portion of said first predetermined major surface;

second securement means comprises adhesive which is disposed directly on said second predetermined major surface of said strap member at least partially limiting movement of said wire relative to said strap member and permanently holding said wire; and said strap member being flexible with a first predetermined portion of said second predetermined major surface secured to a second portion of said second predetermined major surface so that said first and second portions of said second predetermined major surface are separated by a distance no greater than the thickness of said second securement means, and thereby at least partially limiting movement of said wire relative to said substantially planar external member and permanently affixing said wire to said substantially planar external member.

2. A device according to claim 1, wherein:
said first securement means comprises adhesive.

3. A device according to claim 1, wherein:
said strap member comprises aluminum foil.

4. A device according to claim 2, wherein:
said strap member comprises aluminum foil.

5. A device according to claim 1, including:
a first release liner releasably disposed on said first securement means; and
second release liner releasably disposed on said second securement means.

6. A device according to claim 2, including:
a first release liner releasably disposed on said first securement means; and
second release liner releasably disposed on said second securement means.

7. A device according to claim 3, including:
a first release liner releasably disposed on said first securement means; and
second release liner releasably disposed on said second securement means.

8. A device according to claim 4, including:
a first release liner releasably disposed on said first securement means; and
second release liner releasably disposed on said second securement means.

9. A device according to claim 5, wherein:
said strap member, said first securement means, and first release liner terminate in a common plane; and
said second release liner extends beyond said common plane to facilitate and accommodate removal of said second release liner from said second securement means.

10. A device according to claim 6, wherein:
said strap member, said first securement means, and first release liner terminate in a common plane; and
said second release liner extends beyond said common plane to facilitate and accommodate removal of said second release liner from said second securement means.

11. A device according to claim 7, wherein:
said strap member, said first securement means, and first release liner terminate in a common plane; and
said second release liner extends beyond said common plane to facilitate and accommodate removal of said second release liner from said second securement means.

12. A device according to claim 8, wherein:
said strap member, said first securement means, and first release liner terminate in a common plane; and
said second release liner extends beyond said common plane to facilitate and accommodate removal of said second release liner from said second securement means.

* * * * *